United States Patent
Kamiya et al.

(10) Patent No.: US 11,713,360 B2
(45) Date of Patent: Aug. 1, 2023

(54) METHOD FOR PRODUCING CELLULOSE NANOFIBERS

(71) Applicant: TOAGOSEI CO., LTD., Minato-ku (JP)

(72) Inventors: Daisuke Kamiya, Minato-ku (JP); Shiroshi Matsuki, Nagoya (JP)

(73) Assignee: TOAGOSEI CO., LTD., Minato-Ku (JP)

(*) Notice: Subject to any disclaimer, the term of this patent is extended or adjusted under 35 U.S.C. 154(b) by 628 days.

(21) Appl. No.: 16/607,870

(22) PCT Filed: Jun. 1, 2018

(86) PCT No.: PCT/JP2018/021103
§ 371 (c)(1),
(2) Date: Apr. 3, 2020

(87) PCT Pub. No.: WO2018/230354
PCT Pub. Date: Dec. 20, 2018

(65) Prior Publication Data
US 2020/0270369 A1   Aug. 27, 2020

(30) Foreign Application Priority Data
Jun. 16, 2017   (JP) .................. 2017-118178

(51) Int. Cl.
*C08B 15/04* (2006.01)
*C08B 15/02* (2006.01)
*C08B 15/00* (2006.01)

(52) U.S. Cl.
CPC .............. *C08B 15/04* (2013.01); *C08B 15/02* (2013.01); *C08B 15/00* (2013.01)

(58) Field of Classification Search
CPC ..................................................... C08B 15/04
See application file for complete search history.

(56) References Cited

U.S. PATENT DOCUMENTS

2017/0101738 A1   4/2017   Carter et al.

FOREIGN PATENT DOCUMENTS

| EP | 2 395 027 A1 | 12/2011 |
|---|---|---|
| JP | H11-310601 A | 11/1999 |
| JP | 2010-236106 A | 10/2010 |
| JP | 2015-067730 A | 4/2015 |
| JP | 2016-30809 A | 3/2016 |
| JP | 2017-090436 A | 5/2017 |

OTHER PUBLICATIONS

Okada et al., Tetrahedron, 2016, 72, p. 2818-2827. (Year: 2016).*
Espacenet English machine translation of JP 2016030809 A, https://worldwide.espacenet.com/, accessed online on Jul. 13, 2022. (Year: 2022).*
Saito, Tsuguyuki and Isoga, Akira, "Preparation of Cellulose Single Microfibrils from Native Celluloses by TEMPO-Mediated Oxidation", Cellulose Commun, 2007, p. 62-66, vol. 14, No. 2.
Chinese Office Action dated Jul. 5, 2021, and English translation.
Japanese Office Action dated Feb. 7, 2020, and machine translation.
Extended European Search Report (EESR) dated May 29, 2020.
Nicholas Tchang Cervin et al., "Mechanisms Behind the Stabilizing Action of Cellulose Nanofibrils in Wet-Stable Cellulose Foams", Biomacromolecules, Mar. 9, 2015 (Mar. 9, 2015), pp. 822-831, vol. 16, No. 3.
Chinese Office Action dated Apr. 27, 2022, and English translation.
"Clinical Root Canal Therapeutics", Liang Jingping, p. 98, World Publishing Corporation, Shanghai, Mar. 2016, 1st edition.
"Chemistry of Plant Fiber Resources", Li Zhongzheng, p. 283-285, China Light Industry Press, Jun. 2012, 1st edition.
Chinese Office Action dated Sep. 29, 2022, and English translation.
"Preparation of Nanocellulose Whiskers of Coir Fiber by Oxidation Method", Xie Wen-ya, et al., Journal of Chengdu Textile College, vol. 33, No. 2, pp. 21-25, published on Apr. 30, 2016.
"Effect of Nanocellulose Additives on Oxidation of Potato Starch", Liu Quanzu, et al., Biomass Chemical Engineering, vol. 51, No. 1, pp. 13-19, published on Jan. 31, 2017.

* cited by examiner

*Primary Examiner* — Leigh C Maier
(74) *Attorney, Agent, or Firm* — Bulkley, Richardson and Gelinas, LLP; Mary R. Bonzagni, Esq.

(57) ABSTRACT

An object of the present invention is to provide an efficient method for producing cellulose nanofibers, without N-oxyl compounds such as TEMPO remaining in the cellulose nanofibers. Provided is a method for producing cellulose nanofibers, the method including: oxidizing a cellulose raw material with hypochlorous acid, or a salt thereof, having an available chlorine concentration of from 14% by mass to 43% by mass, to produce an oxidized cellulose; and fibrillating the oxidized cellulose into nanofibers.

3 Claims, 2 Drawing Sheets

METHOD FOR PRODUCING CELLULOSE NANOFIBERS

RELATED APPLICATIONS

This application claims priority to PCT Application No. PCT/JP2018/021103, filed Jun. 1, 2018, which claims priority to Japanese Patent Application No. 2017-118178, filed Jun. 16, 2017, both of which are incorporated herein by reference in their entirety.

TECHNICAL FIELD

The present invention relates to a method for producing cellulose nanofibers, the method including oxidizing a cellulose raw material and then fibrillating the obtained oxidized cellulose. More specifically, the present invention relates to a method for producing cellulose nanofibers, in which hypochlorous acid, or a salt thereof, having an available chlorine concentration of from 14% by mass to 43% by mass is used as an oxidant.

BACKGROUND ART

Methods for producing cellulose nanomaterials such as cellulose nanofibers by oxidizing various cellulose raw materials have been studied. For example, a method for oxidizing a cellulose raw material with sodium hypochlorite as an oxidant in the presence of 2,2,6,6-tetramethyl-1-piperidine-N-oxy radical (hereinafter referred to as TEMPO) has been disclosed (Non-Patent Document 1).

In addition, a method for producing an oxidized cellulose has been disclosed, in which, when a cellulose raw material is oxidized with an oxidant such as sodium hypochlorite in the presence of an N-oxyl compound such as TEMPO, the oxidant is gradually added into the reaction system over a certain period of time, by which carboxy groups can be efficiently introduced to the cellulose raw material even with small amount of the N-oxyl (Patent Document 1).

Moreover, a method has been disclosed, in which an oxidized pulp obtained by oxidizing a cellulose raw material with an oxidant such as sodium hypochlorite in the presence of an N-oxyl compound is heated to a temperature of from 50° C. to 120° C. under a condition of pH 3 to 10, and then washed with water, by which the N-oxyl compound incorporated in the oxidized pulp as an impurity is removed (Patent Document 2).

Furthermore, a method for obtaining cellulose nanofibers with little impurities at low cost, in which a cellulose raw material is oxidized with an oxidant in a TEMPO-free system and then further subjected to mechanical processes such as sonication and mixing, has been disclosed (Patent Document 3).

PRIOR ART DOCUMENT

Patent Documents

Patent Document 1: Japanese Patent Application Laid-open (JP-A) No. 2015-67730
Patent Document 2: JP-A No. 2010-236106
Patent Document 3: JP-A No. 2016-30809

Non-Patent Document

Non-Patent Document 1: Cellulose Commun., 14 (2), 62 (2007)

SUMMARY OF INVENTION

Technical Problem

However, in the oxidized cellulose produced using N-oxyl compounds such as TEMPO as catalysts in the prior art documents described above, about several ppm of the N-oxyl compounds remain as nitrogen contents even after well washing.

There is concern about environmental and human toxicities of N-oxyl compounds. Therefore, when a cellulose nanofiber aqueous dispersion is prepared using an oxidized cellulose, N-oxyl compounds will be also incorporated in the dispersion. Thus, when the cellulose nanofibers are used as highly functional materials, the N-oxyl compounds present in the dispersion may have undesirable effects depending on the use thereof.

In addition, since N-oxyl compounds are very expensive materials, production methods employing N-oxyl compounds are not economical.

According to Patent Document 1, it is described that an amount of N-oxyl compounds used can be reduced by gradually adding an oxidant over a certain period of time. However, since the reaction time becomes longer due to the addition of the oxidant over time, this production method is not efficient. Furthermore, since N-oxyl compounds are used in the oxidation reaction, there still remains a problem that a trace amount of the N-oxyl compounds remains in the oxidized cellulose.

According to Patent Document 2, it is described that an oxidized pulp obtained by an oxidation reaction is heated, by which N-oxyl compounds can be removed. However, the need for the heating step makes the production method inefficient and, as is the case with Patent Document 1, there still remains a problem that a trace amount of the N-oxyl compounds remains.

According to Patent Document 3, it is described that a cellulose raw material can be oxidized with only an oxidant such as hydrogen peroxide. However, neither description nor suggestion is made about, as the oxidant, a sodium hypochlorite aqueous solution having an available chlorine concentration of more than 14% by mass.

In view of the above, an object of the present invention is to provide a convenient and efficient method for producing cellulose nanofibers, without N-oxyl compounds such as TEMPO remaining in the cellulose nanofibers.

Solution to Problem

In order to solve the problems described above, the present inventor intensively studied and surprisingly found that a cellulose raw material can be oxidized to produce an oxidized cellulose with, as an oxidant, hypochlorous acid or a salt thereof, having an available chlorine concentration of 14% by mass or more even without N-oxyl compounds such as TEMPO as a catalyst; and that the oxidized cellulose can be fibrillated to produce cellulose nanofibers, thereby completing the present invention.

The first aspect of the present invention is a method for producing cellulose nanofibers, the method including steps of: oxidizing a cellulose raw material with hypochlorous acid, or a salt thereof, having an available chlorine concentration of from 14% by mass to 43% by mass, to produce an oxidized cellulose; and fibrillating the oxidized cellulose into nanofibers.

The second aspect of the present invention is the method for producing cellulose nanofibers according to the first aspect, in which the available chlorine concentration of the hypochlorous acid or the salt thereof is from 18% by mass to 43% by mass.

The third aspect of the present invention is the method for producing cellulose nanofibers according to the first aspect or the second aspect, in which the hypochlorous acid or the salt thereof includes sodium hypochlorite.

Advantageous Effects of Invention

The production method of the present invention does not employ N-oxyl compounds as catalysts; therefore, resulting cellulose nanofibers do not contain N-oxyl compounds and the risk of environmental and human toxicities is significantly reduced. Further, the production method of the present invention does not employ expensive catalysts, i.e., TEMPO compound, and thus is excellent in economy.

DESCRIPTION OF EMBODIMENTS

Figure 1:
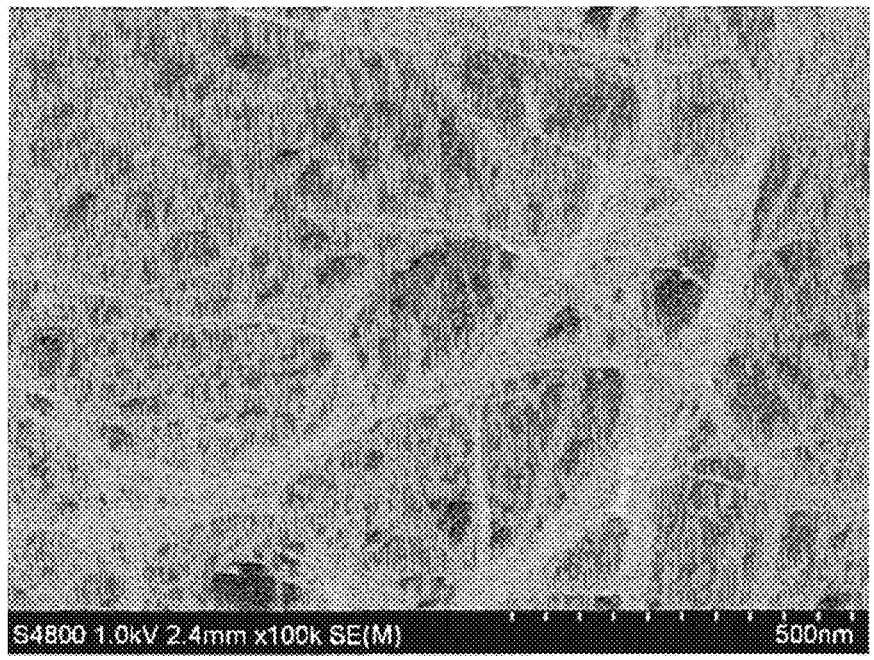
FIG. 1 shows an image of cellulose nanofibers obtained in Example 1, observed by scanning electron microscope (SEM).

The cellulose raw material in the present invention is not particularly limited as long as it is a material mainly containing cellulose. Examples of the cellulose raw material include pulp, natural cellulose, regenerated cellulose, and fine cellulose obtained by depolymerization of cellulose raw materials through mechanical processes. As the cellulose raw material, a commercially available product such as a pulp-derived crystalline cellulose may be directly used. The cellulose raw material may be treated with an appropriate concentration of alkali in order to facilitate permeation of an oxidant used in the next step into the raw material pulp.

The method for producing cellulose nanofibers according to the present invention includes steps of: oxidizing a cellulose raw material with hypochlorous acid, or a salt thereof, having an available chlorine concentration from 14% by mass to 43% by mass, to produce an oxidized cellulose; and fibrillating the oxidized cellulose into nanofibers. The available chlorine concentration of the hypochlorous acid or the salt thereof as an oxidant is preferably from 16% by mass to 43% by mass, and more preferably from 18% by mass to 43% by mass.

When the available chlorine concentration exceeds 43% by mass, hypochlorous acid or a salt thereof easily undergoes self-decomposition and thus is difficult to handle.

The available chlorine concentration of hypochlorous acid or a salt thereof is well known and defined as below.

Hypochlorous acid is a weak acid existing as an aqueous solution. Hypochlorites can exist as solids containing water of crystallization, but are deliquescent and very unstable substances, and thus are usually handled as aqueous solutions.

For example, since sodium hypochlorite, which is a hypochlorite, only exists as a solution, the available chlorine amount in the solution is measured instead of the concentration of sodium hypochlorite itself.

With respect to the available chlorine of sodium hypochlorite, the oxidizing power of a divalent oxygen atom generated by decomposition of sodium hypochlorite corresponds to that of 2 equivalents of monovalent chlorine atoms, and thus a bonding chlorine atom of sodium hypochlorite (NaClO) has the same oxidizing power as that of two atoms of a non-bonding chlorine ($Cl_2$), meaning available chlorine=2×(chlorine in NaClO).

Specifically, the available chlorine concentration is measured by precisely weighing a sample, adding water, potassium iodide, and acetic acid to the sample and leaving the mixture to stand, and titrating the liberated iodine with a sodium thiosulfate solution using an aqueous starch solution as an indicator.

Examples of the hypochlorous acid or the salt thereof in the present invention include an aqueous hypochlorous acid, sodium hypochlorite, potassium hypochlorite, calcium hypochlorite, and ammonium hypochlorite. Among these, sodium hypochlorite is preferable from the viewpoint of ease of handling.

The production method of the present invention will be described below using sodium hypochlorite as an example of the hypochlorous acid or the salt thereof.

(1) Step of oxidizing a cellulose raw material with a sodium hypochlorite aqueous solution having an available chlorine concentration of from 14% by mass to 43% by mass, to produce an oxidized cellulose Examples of the method of adjusting the available chlorine concentration of a sodium hypochlorite aqueous solution to 14% by mass to 43% by mass include (i) a method of concentrating a sodium hypochlorite aqueous solution that has an available chlorine concentration of less than 14% by mass, and (ii) a method of adjusting the available chlorine concentration by directly using a sodium hypochlorite pentahydrate crystal having an available chlorine concentration of about 43% by mass or diluting the sodium hypochlorite pentahydrate crystal with water. Among these, it is preferable to adjust, using sodium hypochlorite pentahydrate, the available chlorine concentration to an available chlorine concentration suitable as an oxidant from the viewpoint of less self-decomposition, that is, less decrease in available chlorine concentration, and ease of adjustment.

The amount of the sodium hypochlorite aqueous solution having an available chlorine concentration of from 14% by mass to 43% by mass used as an oxidant can be selected within a range where the sodium hypochlorite aqueous solution promotes the oxidation reaction.

The method of mixing the cellulose raw material and the sodium hypochlorite aqueous solution is not particularly limited. It is preferable to add the cellulose raw material to the sodium hypochlorite aqueous solution and mix them, from the viewpoint of ease of operation.

The reaction temperature of the oxidation reaction is preferably from 15° C. to 40° C., and more preferably from 20° C. to 35° C. In order to efficiently promote the oxidation reaction, the pH of the reaction system is preferably maintained within a range of from 7 to 14, and more preferably maintained within a range of from 10 to 14. An alkaline agent such as sodium hydroxide, or an acid such as hydrochloric acid may be added in order to adjust the pH.

The reaction time of the oxidation reaction can be set according to degree of progress of oxidation. For example, the reaction time of the oxidation reaction is preferably from about 15 minutes to about 6 hours.

In the oxidation reaction, primary hydroxy groups in the cellulose raw material are oxidized into carboxy groups to produce an oxidized cellulose. The amount of the carboxy groups in the oxidized cellulose is not particularly limited. Considering that the oxidized cellulose is fibrillated to produce cellulose nanofibers in the next step, the amount of the carboxy groups per gram of the oxidized cellulose is preferably from 0.1 mmol/g to 3.0 mmol/g, and more preferably from 0.2 mmol/g to 1.0 mmol/g. The oxidation reaction may be carried out in two separate steps.

The amount of the carboxy groups in the oxidized cellulose can be determined using the following method.

Pure water is added to 0.5% by mass slurry of the oxidized cellulose to achieve a volume of 60 mL, and 0.1 M aqueous hydrochloric acid is added to achieve a pH of 2.5. Then, 0.05 N sodium hydroxide aqueous solution is added dropwise while measuring electrical conductivity until the pH reaches 11. The amount of the carboxy groups in the oxidized cellulose is calculated from the amount of sodium hydroxide (a) that has been consumed in a neutralization step of weak acid in which the change in the electrical conductivity is slow, using the following Formula:

amount of carboxy groups (mmol/g oxidized cellulose)=a (mL)×0.05/mass of oxidized cellulose (g).

(2) Step of fibrillating the oxidized cellulose into nanofibers

The cellulose nanofibers according to the present invention are produced by fibrillating the oxidized cellulose obtained in the step described above into nanofibers.

The fibrillation may be carried out in a solvent under weak agitation using a stirrer or the like, but mechanical fibrillation enables the time for fibrillation to be shortened. However, it is noted that mechanical fibrillation may cause bending or breaking of cellulose nanofibers.

The method for the mechanical fibrillation is not particularly limited. For example, after fully washing the oxidized cellulose with a solvent, the method can be selected as appropriate according to the purpose. Examples of the method include those using known mixers or agitators such as screw mixers, paddle mixers, dispersion mixers, turbine mixers, high-speed homomixers, high-pressure homogenizers, ultrahigh-pressure homogenizers, bicylindrical homogenizers, ultrasonic homogenizers, aqueous counter collision dispersers, beaters, disk refiners, conical refiners, double disk refiners, grinders, and uniaxial or multiaxial kneaders. These may be used singly or in combination of two or more for treatment in a solvent, by which it is possible to fibrillate the oxidized cellulose to produce cellulose nanofibers.

The solvent used for fibrillation is not particularly limited and can be selected as appropriate according to the purpose. Examples of the solvent include water, alcohols, ethers, ketones, N,N-dimethylformamide, N,N-dimethylacetamide, and dimethyl sulfoxide. These may be used singly or in combination of two or more.

Examples of the alcohols include methanol, ethanol, isopropanol, isobutanol, sec-butanol, tert-butanol, methyl cellosolve, ethylene glycol, and glycerin.

Examples of the ethers include ethylene glycol dimethyl ether, 1,4-dioxane, and tetrahydrofuran.

Examples of the ketones include acetone and methyl ethyl ketone.

An organic solvent may be selected as the solvent, by which it becomes easy to separate the oxidized cellulose obtained in the step described above and the cellulose nanofibers obtained by fibrillation thereof. Further, since cellulose nanofibers that are dispersed in the organic solvent is obtained, it becomes easy to mix with resins, monomers as raw materials of the resins, or the like which are soluble in the organic solvent.

The method for producing cellulose nanofibers of the present invention is also applied to obtain cellulose nanocrystals. The widths of cellulose nanofibers and cellulose nanocrystals produced by the production method of the present invention are preferably from 2 nm to 100 nm. When the widths are within the range, the cellulose nanofibers and cellulose nanocrystals are particularly excellent in barrier properties, transparency, and heat resistance.

The fiber length of the cellulose nanofibers is not particularly limited, and is preferably from 10 µm to 1,000 and more preferably from 100 µm to 500 with an aspect ratio (fiber length/fiber diameter) of from about 1,000 to about 15,000, and preferably from about 2,000 to about 10,000.

The fiber length of the cellulose nanocrystals is from about 100 nm to about 1,000 nm (preferably from 150 nm to 500 nm). Cellulose nanocrystals are also called as cellulose nanowhiskers.

EXAMPLES

The present invention will be more specifically described with reference to Examples and Comparative Examples.

Example 1

To a 100-mL beaker, 10.0 g of a sodium hypochlorite pentahydrate crystal having an available chlorine concentration of 43% by mass and 10.5 mL of pure water were added, and the resulting mixture was stirred to obtain an aqueous solution having an available chlorine concentration of 21% by mass. The available chlorine concentration of sodium hypochlorite was measured by the following method.

That is, 0.582 g of the aqueous solution was precisely weighed, and 50 mL of pure water, 2 g of potassium iodide and 10 mL of acetic acid were added thereto. Immediately after that, the resulting mixture was sealed tightly and left in a dark place for 15 minutes. Liberated iodine was titrated with 0.1 mol/L sodium thiosulfate solution (indicator: starch test solution) to find that the titration amount was 34.55 mL. Correction was made via a separate blank test. One milliliter of 0.1 mol/L sodium thiosulfate solution corresponds to 3.545 mg of Cl, and thus the available chlorine concentration in the sodium hypochlorite aqueous solution is 21% by mass.

After heating the sodium hypochlorite aqueous solution to 30° C. in a constant-temperature water bath while stirring using a stirrer, 0.70 g of CEOLUS FD-101 (product name) having an average particle diameter of 50 µm and an amount of carboxy groups of 0.03 mmol/g produced by Asahi Kasei Chemicals Corporation was added as a cellulose raw material.

After supply of the cellulose raw material, the resulting mixture was stirred using a stirrer for 30 minutes while keeping the temperature at 30° C. in the same constant-temperature water bath. Next, pure water was added until the total volume reached 100 mL, and then the resulting mixture was subjected to solid-liquid separation by suction filtration using a PTFE membrane filter having a mesh opening of 0.1 µm. After washing the obtained residue with pure water, the amount of carboxy groups was measured. The amount was 0.36 mmol/g, which was greater than the amount of carboxy groups of the cellulose raw material, meaning that an oxidized cellulose was obtained.

During the stirring for 30 minutes, no intense reaction was observed. The amount of the residue was 0.66 g, representing that no great reduction from that of the cellulose raw material was observed.

The residue was dispersed in pure water to make a slurry (about 1%), and the obtained dispersion was subjected to a fibrillation treatment using an ultrasonic homogenizer for 10 minutes. The liquid after the treatment was placed in a centrifuge tube, added with t-butanol and mixed well, and then centrifuged. The resulting supernatant was removed and t-butanol was added. These operations were repeated 10 times to replace the solvent. Finally, the obtained t-butanol dispersion was freeze-dried and observed using a scanning electron microscope (SEM) (S-4800 manufactured by Hitachi High-Technologies Corporation). As a result, it was found that cellulose nanofibers having widths of from 5 nm to 50 nm were obtained.

FIG. 1 shows an SEM image of the cellulose nanofibers obtained in Example 1 at a magnification of 100,000×.

Example 2

The reactions were performed under the same conditions as in Example 1, except that the available chlorine concentration was changed to 32% by mass.

After a lapse of about 10 minutes from the supply of the cellulose raw material, a reaction with gas generation was observed. The amount of the residue obtained was 0.13 g, and the amount of carboxy groups in the residue was 0.47 mmol/g. The amount was clearly small as compared with the amount of cellulose that was added, and the present inventors assumed that most of the added cellulose was dissolved in the mother liquor.

The mother liquor was added to ethanol, and the obtained precipitate was isolated by solid-liquid separation, washed with ethanol, and then dried to obtain an evaluation sample (collection from the mother liquor). The amount of the collection from the mother liquor was 0.38 g, demonstrating that most of cellulose after the treatment was dissolved in the mother liquor. The amount of carboxy groups in the filtrate was 0.67 mmol/g.

The residue and the filtrate were each dispersed in pure water and subjected to a fibrillation treatment using an ultrasonic homogenizer, resulting in entirely transparent process liquids in one minute.

To each of the process liquids obtained by fibrillating the residue and the filtrate, was added t-butanol, followed by solvent replacement, freeze-drying, and SEM observation in the same manner as in Example 1. As a result, it was found that rod-like cellulose nanocrystals having widths of about 100 nm and lengths of from 0.4 μm to 1.0 μm were obtained in each case.

Example 3

The reactions were performed under the same conditions as in Example 1, except that sodium hypochlorite pentahydrate having an available chlorine concentration of 43% by mass was heated to 30° C. and used in a melt state.

The amount of carboxy groups in the residue (the amount obtained was 0.01 g or less) was 1.5 mmol/g, and the amount of carboxy groups in the filtrate (the amount obtained was 0.59 g) was 4.9 mmol/g. As a result of SEM observation of the filtrate, it was found that rod-like cellulose nanocrystals having widths of about 100 nm and lengths of from 0.4 μm to 1.0 μm were obtained.

Figure 4:
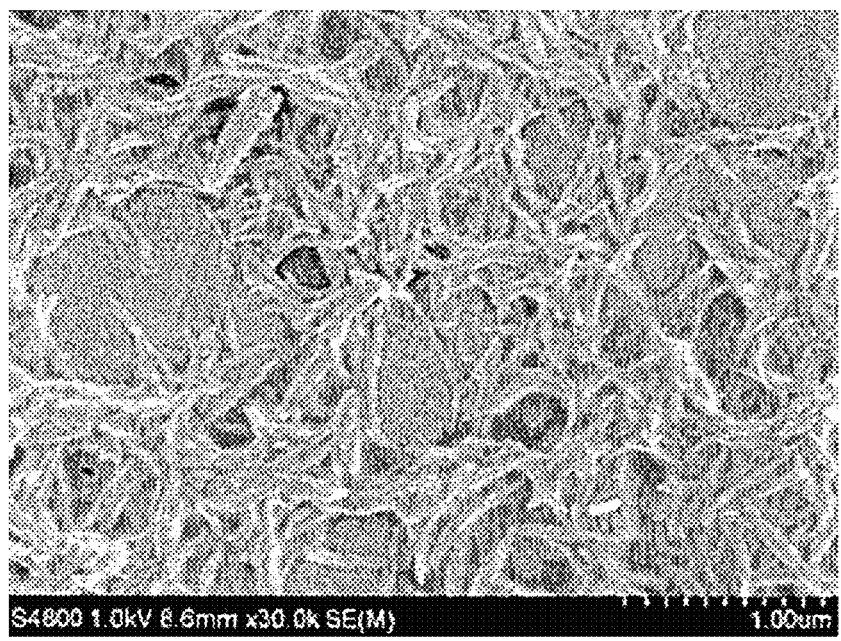
FIG. 4 shows an image of cellulose nanocrystals obtained in Example 3, observed by scanning electron microscope (SEM).

FIG. 4 shows an SEM image of the cellulose nanocrystals obtained in Example 3 (at a magnification of 50,000×).

Example 4

The reactions were performed under the same conditions as in Example 1, except that the available chlorine concentration was changed to 18% by mass.

The amount of residue was 0.63 g, and the amount of carboxy groups was 0.16 mmol/g. As a result of SEM observation of the residue, it was found that cellulose nanofibers having widths of from 5 nm to 50 nm were obtained.

Example 5

The reactions were performed under the same conditions as in Example 1, except that the available chlorine concentration was changed to 26% by mass.

During the stirring for 30 minutes, no intense reaction was observed. The amount of residue was 0.40 g, and the amount of carboxy groups was 0.41 mmol/g.

As a result of SEM observation of the residue, it was found that cellulose nanofibers having widths of from 5 nm to 50 nm were obtained.

Example 6

To a 100-mL beaker, 30.0 g of a sodium hypochlorite pentahydrate crystal having an available chlorine concentration of 43% by mass was added, pure water and 35% by mass of hydrochloric acid were added thereto, and the resulting mixture was stirred to obtain an aqueous solution having an available chlorine concentration of 18% by mass and pH of 7.0.

After heating the sodium hypochlorite aqueous solution to 30° C. in a constant-temperature water bath while stirring using a stirrer, 0.35 g of mechanically fibrillated cotton-like softwood pulp (SIGMA-ALDRICH NIST RM8495, bleached kraft pulp) having an amount of carboxy groups of 0.05 mmol/g was added as a cellulose raw material.

After supply of the cellulose raw material, 48% by mass of sodium hydroxide was added in order to maintain a pH of 7.0 and the resultant mixture was stirred using a stirrer for 30 minutes while keeping the temperature at 30° C. in the same constant-temperature water bath. The resulting mixture was subjected to solid-liquid separation by suction filtration using a PTFE membrane filter having a mesh opening of 0.1 μm. After washing the obtained residue with pure water, the amount of carboxy groups was measured, which was 1.26 mmol/g, and the amount of the residue was 0.09 g.

Example 7

The reactions were performed under the same conditions as in Example 6, except that the available chlorine concentration was changed to 14% by mass. As a result, the amount of carboxy groups was 0.62 mmol/g, and the amount of the residue was 0.16 g.

Examples 8 to 16

The reactions were performed in the same manner as in Example 6, except that the available chlorine concentration and pH during the reaction were changed as shown in Table 1. For the obtained products, the amounts of carboxy groups and the amounts of the residues are shown in Table 1.

As a result of fibrillation of the residue obtained in Example 10 into nanofibers in the same manner as in Example 1 and observation using scanning electron microscope (SEM), it was found that cellulose nanofibers having widths of from 10 nm to 20 nm were obtained.

Figure 2:
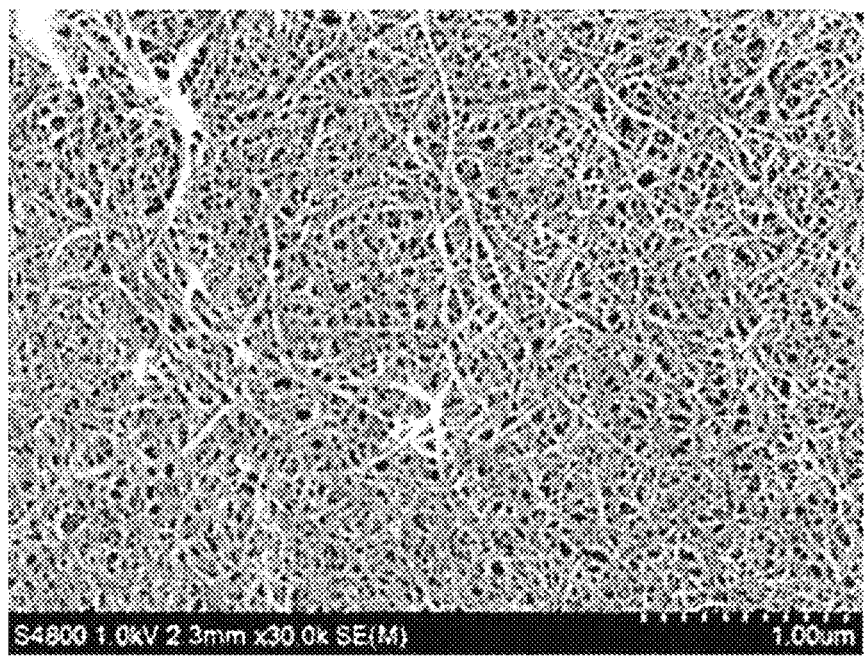
FIG. 2 shows an image of cellulose nanofibers obtained in Example 10, observed by scanning electron microscope (SEM).

FIG. 2 shows an SEM image of the cellulose nanofibers obtained in Example 10 (at a magnification of 30,000×).

As a result of fibrillation of the residue obtained in Example 7 into nanofibers in the same manner as in Example 1 and observation using scanning electron microscope (SEM), it was found that cellulose nanocrystals having widths of from 30 nm to 70 nm and lengths of from 30 nm to 280 nm were obtained.

Figure 3:
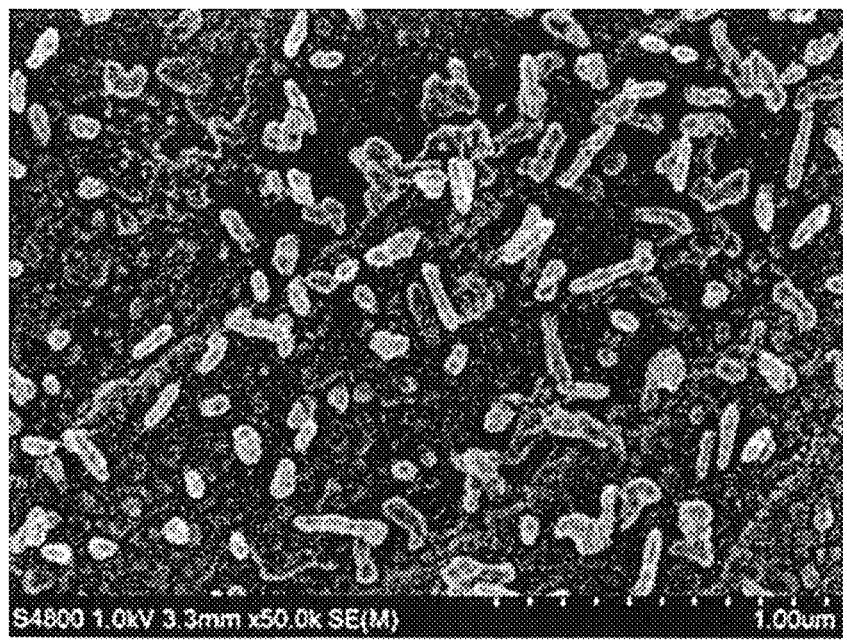
FIG. 3 shows an image of cellulose nanocrystals obtained in Example 7, observed by scanning electron microscope (SEM).

FIG. 3 shows an SEM image of the cellulose nanocrystals obtained in Example 7 (at a magnification of 50,000×).

TABLE 1

| Example | Available Chlorine Concentration (% by mass) | pH | Amount of Carboxy Groups (mmol/g) | Amount of Residue (g) |
|---|---|---|---|---|
| 6 | 18 | 7 | 1.26 | 0.09 |
| 7 | 14 | 7 | 0.62 | 0.16 |
| 8 | 18 | 9 | 0.72 | 0.09 |
| 9 | 14 | 9 | 2.26 | 0.12 |
| 10 | 21 | 11 | 0.40 | 0.31 |
| 11 | 18 | 11 | 0.40 | 0.31 |
| 12 | 14 | 11 | 0.31 | 0.29 |
| 13 | 21 | 13 | 0.34 | 0.29 |
| 14 | 18 | 13 | 0.18 | 0.34 |
| 15 | 21 | 14.5 | 0.75 | 0.12 |
| 16 | 18 | 14.5 | 0.72 | 0.13 |

Comparative Example 1

The reactions were performed under the same conditions as in Example 1, except that the available chlorine concentration was changed to 12% by mass.

The amount of carboxy groups of the residue was 0.07 mmol/g, which was almost the same value as that of the cellulose raw material, representing that oxidation had hardly proceeded. The amount obtained was 0.63 g, representing that no great reduction from that of the cellulose raw material was observed.

Since oxidation did not proceed, the step of fibrillation into nanofibers was not carried out.

Comparative Example 2

The reactions were performed under the same conditions as in Example 1, except that the available chlorine concentration was changed to 7% by mass.

The amount of carboxy groups of the residue was 0.09 mmol/g and is slightly different from that of the cellulose raw material, representing that oxidation had hardly proceeded. The amount obtained was 0.69 g, representing that no great reduction from that of the cellulose raw material was observed.

Since oxidation did not proceed, the step of fibrillation into nanofibers was not carried out.

What is claimed is:

1. A method for producing cellulose nanofibers, the method comprising:
    oxidizing a cellulose raw material with a solution prepared from hypochlorous acid, or a salt thereof, having an available chlorine concentration of from 14% by mass to 43% by mass, not with 2,2,6,6-tetramethylpiperidine 1-oxyl radical (TEMPO), to produce an oxidized cellulose; and
    fibrillating the oxidized cellulose into nanofibers.

2. The method for producing cellulose nanofibers according to claim 1, wherein the available chlorine concentration of the hypochlorous acid or the salt thereof is from 18% by mass to 43% by mass.

3. The method for producing cellulose nanofibers according to claim 1, wherein the hypochlorous acid or the salt thereof comprises sodium hypochlorite.

* * * * *